United States Patent [19]

Roy, Jr. et al.

[11] 4,423,015

[45] Dec. 27, 1983

[54] PROCESS OF PRODUCING DEFLUORINATED PRODUCT FROM LOW BPL PHOSPHATE ROCK

[75] Inventors: John W. Roy, Jr., Gainesville; Melvin J. Arbie, Live Oak; Joel P. Holmes, Lake City, all of Fla.

[73] Assignee: Occidental Chemical Company, Los Angeles, Calif.

[21] Appl. No.: 345,949

[22] Filed: Feb. 4, 1982

[51] Int. Cl.$^3$ .......................... C01F 1/00; C01F 5/00; C01F 11/00

[52] U.S. Cl. .................................. 423/167; 423/304; 423/319; 71/DIG. 3

[58] Field of Search ............... 423/166, 167, 319, 307, 423/304; 71/DIG. 3

[56] References Cited

U.S. PATENT DOCUMENTS

| | | | |
|---|---|---|---|
| 2,478,200 | 8/1949 | Maust et al. | 71/44 |
| 2,479,389 | 8/1949 | Maust et al. | 71/44 |
| 2,531,046 | 11/1950 | Hollingsworth | 71/38 |
| 2,556,541 | 6/1951 | Hollingsworth | 71/44 |
| 2,556,542 | 6/1951 | Hollingsworth | 71/47 |
| 2,753,253 | 7/1956 | Hollingsworth | 71/44 |
| 2,754,191 | 7/1956 | Hollingsworth et al. | 71/45 |
| 2,778,722 | 1/1957 | Hollingsworth | 71/44 |
| 2,995,436 | 8/1961 | Hollingsworth et al. | 71/DIG. 3 |
| 2,995,437 | 8/1961 | Hollingsworth | 71/46 |
| 2,997,367 | 8/1961 | Williams | 23/109 |
| 3,002,812 | 10/1961 | Williams | 23/109 |
| 3,058,804 | 10/1962 | Tynan | 23/109 |
| 3,099,530 | 7/1963 | Nickerson | 23/108 |
| 3,142,534 | 7/1964 | Nickerson | 23/108 |
| 3,151,936 | 10/1964 | Hollingsworth et al. | 23/109 |
| 3,151,937 | 10/1964 | Nickerson | 23/108 |
| 3,151,941 | 10/1964 | Hollingsworth et al. | 23/165 |
| 3,292,995 | 12/1966 | Allen | 23/108 |
| 3,364,008 | 1/1968 | Hollingsworth et al. | 71/41 |
| 3,421,849 | 1/1969 | Baumann | 423/304 |
| 4,243,643 | 1/1981 | Mills | 423/319 |

FOREIGN PATENT DOCUMENTS

| | | |
|---|---|---|
| 242653 | 1/1963 | Australia . |
| 689205 | 6/1964 | Canada . |
| 902361 | 8/1962 | United Kingdom . |

OTHER PUBLICATIONS

Article–"Production of Defluorinated Phosphate Rock–-Calcining without Fusion in Rotary Kilns"–by W. T. Whitney & C. A. Hollingsworth, Jul. 1949 of Industrial and Engineering Chemistry, pp. 1325–1327.

*Primary Examiner*—Gregory A. Heller
*Attorney, Agent, or Firm*—Barry A. Bisson

[57] ABSTRACT

In a process for producing a defluorinated product containing calcium, sodium and phosphorus, by calcination of a mixture of phosphate rock, with caustic soda, phosphoric acid and water, an improvement comprises maintaining the amount of phosphoric acid in the mixture such that the ratio of phosphorus in percentage by weight on a dry basis in said mixture-to-the phosphorus desired in percentage by weight in the calcined product is substantially equivalent to the ratio of the calcium in percentage by weight on a dry basis in the mixture-to-the calcium in percentage by weight in the calcined product. The process is especially useful where the phosphate rock has a bone phosphate of lime analysis of about 73% or less (e.g., about 71.5%), and also where the caustic soda is added to a mixture of phosphate rock and phosphoric acid prior to the addition of water.

6 Claims, 2 Drawing Figures

PROCESS OF PRODUCING DEFLUORINATED PRODUCT FROM LOW BPL PHOSPHATE ROCK

BACKGROUND OF THE INVENTION

To be useful as supplements for feeding cattle and swine, calcium phosphate products must contain very low proportions of fluorine, (see, for example, U.S. Pat. No. 4,243,643 to Mills). When such low fluorine content products are made from phosphate rock, a typical process involves making a reaction mixture of phosphate rock, a sodium compound and phosphoric acid, which reaction mixture is then calcined at high temperatures (1900° F. or higher) to cause fluorine to evolve. At such high temperatures detrimental melting can occur if the impurity content of the reaction mixture (especially $SiO_2$) is too high for the particular calcination temperature required to drive off the desired amount of fluorine. Accordingly, it has heretofore been necessary to use only the higher quality phosphate rocks in making such defluorinated products by calcination. The present invention provides a means of using lower grade phosphate rock (e.g., less than about 72% BPL) in such calcination mixtures and means of minimizing the loss of P and Na during the calcination.

The invention involves controlling the amount of phosphoric acid in the mixture such that the ratio of phosphorus in percentage by weight on a dry basis in said mixer-to-the phosphorus desired in percentage by weight in the calcined product is substantially equivalent to the ratio of the calcium in percentage by weight on a dry basis in the mixture-to-the calcium in percentage by weight in the calcined product.

It is also useful, in one non-limiting embodiment of the invention, to control the weight ratio of P in the phosphoric acid to P in the rock so as to prevent substantial fusion.

U.S. Pat. Nos. 4,243,643 and 2,995,439 are illustrative of the processes for making such defluorinated phosphate rock products using sodium carbonate. In the latter patent, it is noted that soda ash containing over 98% $Na_2CO_3$ is preferably prereacted with phosphoric acid and the reagent mixture mixed with the phosphate rock, then introduced into the calcination apparatus. This patent further prefers to premix the reagents and the phosphate rock, (advantageously in a pug mill or the like), and further notes that sodium compounds other than soda ash, such as sodium hydroxide, can be used in the reaction mixture. This patent does not specifically describe how to react low BPL phosphate rock, merchant grade phosphoric acid, caustic and water in order to produce a feed suitable for calcination to make such a low fluorine containing product without detrimental melting, in the manner of the present invention.

U.S. Pat. No. 2,997,367, to Williams, in an example, shows contacting phosphate rock with a merchant grade strength acid (54% $P_2O_5$) and soda ash. No water is added in this example nor is caustic soda mentioned. This patent provides a correlation between calcium, $P_2O_5$, $SO_3$, F, Mg, Na, $K_2O$, $Fe_2O_3$ and $Al_2O_3$ in the feed. It shows no correlation, such as used in the present invention, between the $P_2O_5$ content of the phosphoric acid being used and the $P_2O_5$ content of the phosphate in the rock, which could be used to permit the use of low BPL phosphate rock in such a product with a minimum loss of added phosphoric acid and/or sodium during the calcination and without detrimental melting.

British patent specification No. 902,361, published Aug. 1, 1962 of Hollingsworth, provides a correlation between CaO, $Na_2O$, $P_2O_5$ and $SiO_2$. At page 2, column 1 lines 32–57 there is a discussion of the practice in the United States at that time of maintaining the amount of added phosphoric acid at about 3.6% (calculated as $P_2O_5$). However, Hollingsworth teaches against this practice and urges the use of between 7 and 12% added $P_2O_5$ (see page 2 column 2 lines 66–106). This patent does not provide a means of utilizing low BPL rock by means of the correlation and other improvements of the present invention.

Other related U.S. Pat. Nos. of Hollingsworth and of Hollingsworth with other inventors are 2,478,200; 2,479,389; 2,531,046; 2,556,541; 2,556,542; 2,753,253; 2.754.191: 2.778.722: 3.151.936: 3,151,941, and, 3,364,008.

A history of the development of such defluorinated phosphate rock products, both for use as a fertilizer and as a mineral supplement for animal feeds, is described in volume 41 *Industrial and Engineering Chemistry*, No. 7 pages 1325–1327, by Whitney and Hollingsworth.

U.S. Pat. No. 3,002,812 to Williams notes that the phosphorus pentoxide content in a saleable ore varies from 30% to 36%, corresponding to a BPL of about 65% to about 75%, i.e., (% $P_2O_5$ multiplied by 310/142).

U.S. Pat. No. 3,058,804 to Tynan has examples wherein defluorinated products are made from Florida phosphate rock of approximately 77% BPL by blending the rock with phosphoric acid for about 3 minutes in a pug mill and then adding sodium carbonate and pug milling for 5 additional minutes. In this patent the phosphoric acid is described as being made from 72 BPL rock, and no mention is made of using such a low BPL rock other than as a source for phosphoric acid manufacture.

U.S. Pat. Nos. 3,099,530; 3,142,534; and 3,151,937 to Nickerson show various processes in which steam is used to assist the defluorination of calcine reaction mixtures.

Also relevant are U.S. Pat. Nos. 3,058,804 to Tynan and 3,292,995 to Allen, Australian Pat. No. 242,653 published Dec. 13, 1962 and Canadian Pat. No. 689,205 issued June 23, 1964, both to Hollingsworth.

It can be seen from the above discussion of the prior art, that there is a need for a process which (a) produces a reaction mixture, from phosphate rock, phosphoric acid, caustic and water and low BPL rock (e.g., less than about 73% BPL), and (b) converts the reaction mixture by calcination, without detrimental melting, to a low fluorine containing product suitable for use as a fertilizer or, more preferred, as an animal feed supplement.

All percentages herein are by weight unless otherwise specified.

In this application, a reference to calcium is intended to also include calcium oxide as an equivalent. Calcium is referred to primarily because the usual laboratory analysis is for calcium, which is then sometimes reported as CaO. Furthermore, any other inert element or compound in the phosphoric rock which is not volatile at the calcination temperature, (e.g., Fe, Al, Mg) can be used to provide the same ratio, and is an equivalent to calcium in that respect in this invention.

SUMMARY OF THE INVENTION

The invention involves a process for producing a defluorinated product containing calcium and phosphorus and which can be useful as a fertilizer or as an animal feed supplement. The process involves calcination of a reaction mixture comprising phosphate rock, phosphoric acid, a sodium compound, such as caustic soda, and water.

Broadly, the invention involves a process for producing a defluorinated product containing calcium, sodium and phosphorus by calcination of a mixture of phosphate rock comprising phosphorus, calcium and fluorine with caustic soda, phosphoric acid and water, and the improvement wherein the amount of phosphoric acid in the mixture is controlled such that the ratio of phosphorus in percentage by weight on a dry basis in said mixture-to-the phosphorus desired in percentage by weight in the calcined product is substantially equivalent to the ratio of the calcium in percentage by weight on a dry basis in the mixture-to-the calcium in percentage by weight in the calcined product.

The phosphate rock can have a bone phosphate of lime (BPL) analysis of from about 71% to about 77%; however, the invention is especially useful in using low BPL phosphate rock, especially where the phosphate rock has a bone phosphate of lime analysis of about 73% or less, for example, where the phosphate rock has a bone phosphate of lime analysis of about 71.5%.

The invention is useful, for example, where the phosphate rock has a bone phosphate of lime analysis of from about 71 to about 77 and the desired percent by weight of phosphorus in the calcined product is from about 17% to about 18.9% by weight.

In a preferred, but not limiting, embodiment the proportion of phosphorus in the form of phosphoric acid used to make the mixture is such that there is no substantial fusion of the reaction mixture or product upon calcination.

For example, the invention includes a process for producing a defluorinated product containing calcium, sodium and phosphorus by calcination of a mixture of phosphate rock comprising phosphorus, calcium, and fluorine with caustic soda, phosphoric acid and water, wherein the amount of phosphoric acid in the mixture is such that the ratio of phosphorus in percentage by weight on a dry basis in said mixture-to-the phosphorus desired in percentage by weight in the calcined product is substantially equivalent to the ratio of the calcium in percentage by weight on a dry basis in the mixture-to-the calcium in percentage by weight in the calcined product, and wherein said mixture is made by adding, during mixing, phosphoric acid to the phosphate rock followed by the addition of caustic soda and then the addition of water.

Another non-limiting embodiment of the invention involves:

(a) Determining, for a source of phosphate rock, the ratio of Ca in dry phosphate rock to the Ca in calcinated phosphate rock;

(b) thereafter determining by analysis the phosphorus in phosphoric acid and in a phosphate rock;

(c) based on said analysis, and using the ratio of Ca, adding sufficient phosphoric acid to the phosphate rock such that the ratio of phosphorus in percentage by weight on a dry basis in said mixture-to-the phosphorus desired in percentage by weight in the calcined product is substantially equivalent to the ratio of the calcium in percentage by weight on a dry basis in the mixture-to-the calcium in percentage by weight in the calcined product;

(d) making a reaction mixture from components comprising said phosphate rock, phosphoric acid from said source, caustic and water; and (e) calcining said reaction mixture to produce, without detrimental melting (without substantial fusion), a defluorinated product from said reaction mixture.

The process is especially useful wherein the phosphate rock component of the reaction mixture has a bone phosphate of lime value (BPL) less than about 73% (e.g., about 71.5%).

The reaction mixture can be prepared in conventional equipment, such as in a reaction pug mill configured such that there are inlets for separate, serial feeding to the reaction pug mill in a continuous manner, by first introducing phosphate rock, then phosphoric acid, then caustic and then water. In such a reaction pug mill, the reaction mixture is formed by feeding the components to the pug mill by the separate serial feeding sequence noted above. Unexpectedly, it has been discovered that this sequence, with a reaction pug mill, for preparing a reaction mixture for calcination, (when compared with the previous sequence of reacting the phosphate rock first with caustic, then water, and then the phosphoric acid), results in far lower losses of caustic (i.e., sodium) during the calcination, produces less corrosion of brick linings, reduces wear on the pug mill paddles, and, when used in conjunction with two pug mills in series (one a reactor and, at the outlet of the reactor, a second for granulation), virtually eliminates balls forming in the fluid bed (which can cause unscheduled shutdowns).

The sequence outlined above, wherein the caustic is added after the rock and phosphoric acid have been intermixed, results in less sodium phosphates being lost through volatilization during the calcination or defluorination process. For example, in a commercial reaction pug mill, the above sequence resulted in a 20% reduction in caustic losses compared to the previous sequence. It enabled the use of a cheaper brick lining (e.g., high Al instead of basic), and reduced wear on pug mill paddles. For example, under the previous sequence the paddles had to be replaced about 5 times each week. With the new sequence, paddle replacement was extended to a period of from one to two months.

Trisodium phosphate is the least volatile of the sodium phosphates. It is believed that by adding the caustic, especially for a pug mill, after the mixing of the phosphate rock and phosphoric acid, an excess of caustic is maintained in the reaction mixture as the sodium phosphates form. This maximizes the production of the least volatile trisodium phosphate. This method, or sequence, of addition also releases less heat than in the previous sequence when the water was added, which may be one of the reasons why pug mill material deterioration was reduced.

Note that one of the important findings in the present invention is that the conditions of making the reaction mixture should be chosen such that an excess of caustic is present at the reaction areas of the pug mill where the sodium phosphates are formed, in order to favor the formation of trisodium phosphate over the sodium acid phosphates which can form when there is an excess of phosphoric acid relative to the amount of sodium. By adding water after the caustic has reacted with the acid, the heat of dilution is reduced, which further aids in reducing damage to the internal components of the pug mill.

The addition of water, when a pug mill reactor is used in the present process, is necessary in order to provide the proper fluidity for the reaction mixture to exit the reaction pug mill, and, in a preferred nonlimiting embodiment, form dense granules in a second pug mill connected in series to the reaction pug mill. This second pug mill can be termed a "granulation pug mill". Such a construction of two pug mills in series, one utilized for making the reaction mixture and the second for producing granules, is especially useful when the calcination is done in a fluid bed calciner.

It is to be clearly understood that the improvement is not limited to use in one particular type of apparatus, such as a reaction pug mill. The improvement may be utilized in other mixing apparatuses.

FURTHER DESCRIPTION OF THE INVENTION

Figure 1:
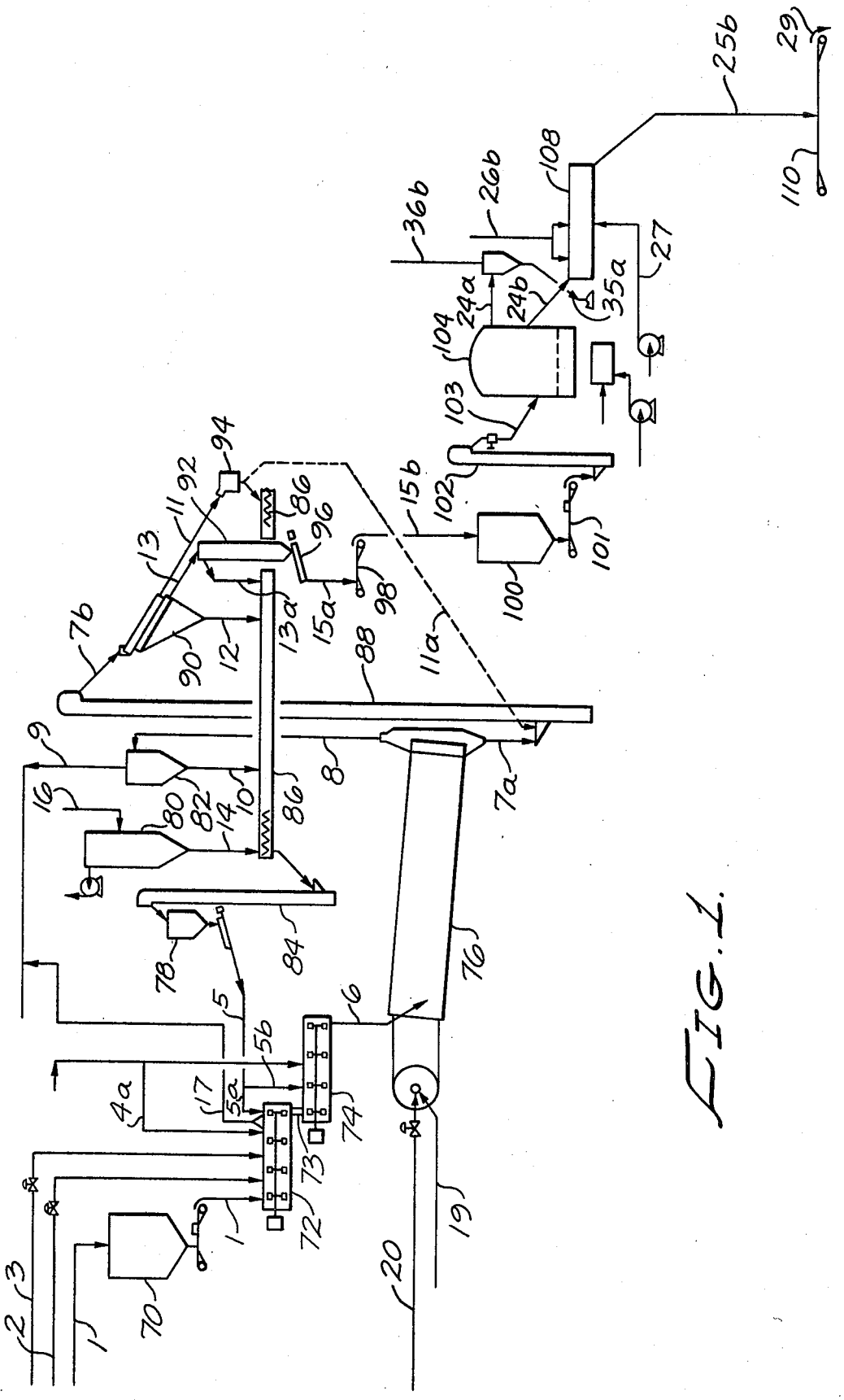
FIG. 1 herein is a schematic flow sheet of a process for producing a defluorinated product, commonly known in the trade as "Pollyphos" by the calcination of a reaction feed mixture made by first introducing phosphate rock, phosphoric acid, caustic and water to a mixing vessel, such as a reaction pug mill connected in series to a second mixing apparatus, such as a granulation pug mill, and then calcinating the resulting granules, in a fluid bed calciner, to produce a low fluorine content product, useful as a fertilizer or as an animal feed supplement (which would typically have a weight ratio of P/F greater than 50, typically greater than 100).
Figure 2:
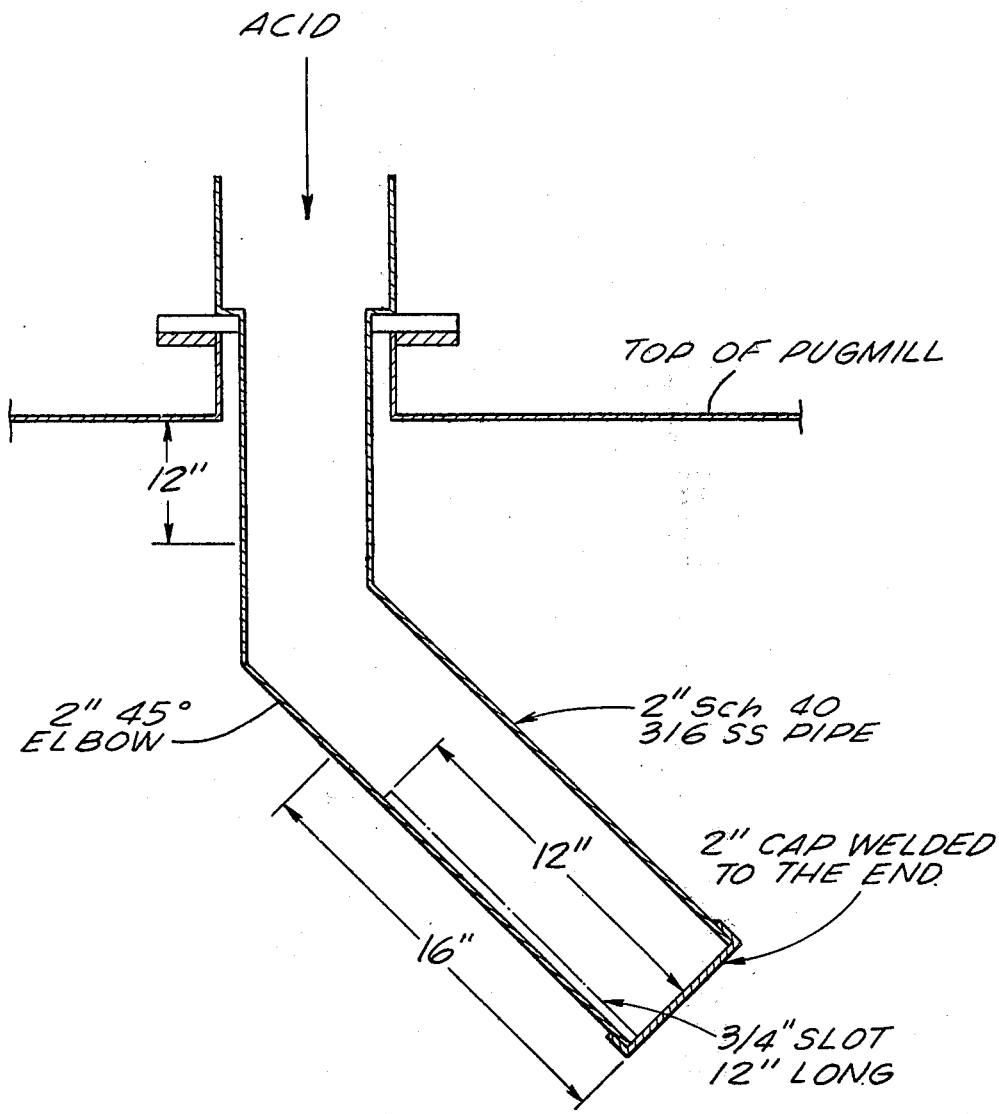
FIG. 2 herein is an illustration of a distribution pipe which is especially useful for introducing phosphoric acid into a reaction pug mill. This drawing illustrates an invention of Earl Hickman, George Bien, and John Roy, and will be claimed in a later filed application. In operation, the acid exiting the distribution pipe is in the shape of a fan pointing toward the discharge end of the pug mill. This unique distribution of the phosphoric acid is advantageous in a reaction pug mill.

The present invention involves the discovery that a phosphate rock having a particular calcium and phosphorus content (together with fluorine and other components which are removed upon calcination) can be calcined in a reaction feed mixture with phosphoric acid, caustic and water wherein the amount of phosphoric acid in the mixture is controlled such that the ratio of phosphorus in percentage by weight on a dry basis in said mixture-to-the phosphorus desired in percentage by weight in the calcined product is substantially equivalent to the ratio of the calcium in percentage by weight on a dry basis in the mixture-to-the calcium in percentage by weight in the calcined product. It has been further found that this discovery can be used to provide such fine control that it enables the use of rock of a BPL lower than could heretofore be used economically in the production of such defluorinated products (e.g., 71.5% BPL rock can be used in the process described herein).

A sample of the reaction feed mixture, containing sufficient phosphoric acid based on the knowledge of the phosphorus and volatile components in the rock to provide a calcined product having the desired phosphorus content, is dried in an oven at about 105° C. and a portion analyzed for calcium (usually expressed as CaO). The dried sample is then subjected to calcination at a temperature of at least about 1900° F., (e.g., about 2500° F.) to drive off volatile matter at that temperature. A portion of the calcined product is analyzed for calcium. The ratio of the weight of a non-volatile component, such as CaO, in the dried reaction feed mixture to the weight of the same non-volatile component in the calcined product sometimes, hereinafter referred to as the "volatility factor", is then determined. If the ratio of P in the reaction feed mixture-to-the P in the calcined product is not the same as the comparable ratio for calcium that was determined, then the amount of phosphoric acid added in making the mixture can be adjusted so that the two ratios are substantially the same.

The volatility factor is used to determine the amount of phosphoric acid to add to the reaction feed mixture to produce a final calcined product containing the specified P. The use of the volatility factor aids in insuring that a minimum amount of the P is lost by vaporization in the calciner. For example, for a phosphate rock where the volatility factor was 0.907, to make a final defluorinated product analyzing at least 18% P, the following calculations were used in determining the phosphoric acid fed to the reaction feed mixture: for 18% P in the calcined product, $(0.907)(18.0) = 16.4\%$ P, is needed in the uncalcined, dry reaction feed mixture. The portion of the percent P attributable to the P in the rock is subtracted from 16.4% to determine the portion of the percent P that is to be attributed to P added in the form of phosphoric acid. One skilled in the art can then readily calculate the amount of phosphoric acid of a given concentration that must be added in making the reaction feed mixture so that upon drying and calcining the phosphorus ratio will be substantially equal to the calcium ratio.

Any commercial phosphoric acid can be used in the process of this invention. An example of a phosphoric acid is one analyzing at least about 38% $P_2O_5$, (typically about 50% to 54% $P_2O_5$). It is also preferred that the content of solid impurities in the phosphoric acid be less than about 1% by weight, more preferred no greater than 0.5% (typically about 0.3% or less). A process for obtaining such a low impurity content phosphoric acid involves treating the phosphoric acid by the processes of U.S. Pat. No. 4,243,643 to Mills, et.al., preferably by adding the calcium and fluorine containing solids obtained by the liming of phosphate plant pond waters, to the phosphoric acid, adding sulfuric acid thereto, aging the acid, preferably at elevated temperature in order to cause a solid to precipitate, and separating the phosphoric acid from the precipitated solids preferably by the processes described in the said patent of Mills.

Further preferred is that the separation of the solids from the phosphoric acid be done by the process of U.S. Pat. No. 4,235,854 of Smith et.al., (such process being sometimes termed "secondary filtration").

The most preferred process for obtaining the phosphoric acid feed component is to treat a concentrated, merchant grade phosphoric acid containing at least about 50% $P_2O_5$, with the addition of sulfuric acid and calcium and fluoride containing solids of the Mills patent, separating the solids (after aging), using the secondary filtration of Smith et.al., and then further aging the phosphoric acid at ambient temperature to cause further solids to settle and decanting a low impurity content phosphoric acid from the so-aged phosphoric acid.

It is also preferred that the secondary filtration be conducted using the temperature controlled spray means taught in U.S. Pat. No. 4,313,919 of Richards et.al. It should be noted, however, because the weight of phosphoric acid used is far less (about ⅛th to 1/9th) then the amount of phosphate rock used in such reaction mixtures, that the impurity level of the phosphate rock has a far greater influence than does the impurity level of the phosphoric acid. It is still, however, advantageous to use a low impurity phosphoric acid in order to be able to use a lower BPL content phosphate rock. Likewise, it should be noted that small differences in the BPL of the rock (e.g., in the order of 0.1%) can have a significant difference on the utility of the rock in a calcination feed mixture and on the economics of producing the final defluorinated product. It should also be noted that in a phosphoric acid only about 50% of the solids which deposit from the acid on natural aging are metallic or other impurities and about 50% of the weight of the solids is $P_2O_5$.

Caustic is preferred rather than soda ash in the present process, despite its higher cost, because it gives a higher heat of reaction than does soda ash, which aids in the formation of dicalcium phosphates, rather than monocalcium phosphates, during reaction of the phosphoric acid with the rock. Also, the risk of having unreacted soda ash, generally causes producers who use soda ash to premix it with phosphoric acid and, thus, decrease the amount of acidic $P_2O_5$ available to react with the rock in the reaction mixture. When phosphoric acid is premixed with soda ash, less trisodium phosphate is formed and more sodium compounds are lost by volatilization.

The present invention involving the use of a ratio of a non-volatile component, can be used as a control means in manufacture of any product which is to be calcined; such as when calcining phosphate rock.

This invention is especially useful in making low-fluorine-content products containing calcium (especially at least 31% CaO) and in the range of 15–18.9% P (although the present industry standard is 18% P). Because of the difficulty in obtaining phosphate rock of about 77 BPL or greater (as used in many prior art patents), it is very difficult to make low fluorine calcined products containing more than about 18.9% P, due to melting caused by the additional phosphoric acid needed with lower grade rock.

Although the use of water can be decreased, or even eliminated, by using a more dilute phosphoric acid, it is preferred to use a purified merchant grade phosphoric acid in order to be able to use a lower BPL phosphate rock, even though the usage of phosphoric acid is much lower on a weight ratio basis than is the amount of phosphate rock. In any event, sufficient water is added to the reaction mixture to provide proper fluidity of the reaction feed material and proper nodule formation in order to provide a good granular product for the calcination process, especially with a fluid calcination apparatus.

The invention in one aspect involves the discovery that there is a maximum ratio of P in the phosphoric acid to P in the phosphate rock, above which detrimental melting can occur and that (in conjunction with the weight ratio of CaO or other non volatile material, in the dried feed to CaO in calcined feed mixture), this ratio could be used to provide the requisite fine control required to utilize lower grade phosphate rock (and aid in reducing losses of P and Na). Prior to this discovery a method of control which was commonly used in correlating feed properties with product properties, and to determine where detrimental melting would occur, was to attempt to simulate in a combustion tube furnace the conditions in the fluid bed or other calcination reactor and to process samples of feed mixtures made from a given phosphate rock and a given phosphoric acid. Surprisingly, such a simulation technique does not provide as fine a means of controlling the calcination mixture, for a given rock, as does the correlation of the present invention. This simulation technique did tell if there was insufficient phosphorus in the reaction feed mixture to provide the amount of phosphorus required in the final product; however, it did not tell whether there was excess phosphorus in the reaction feed mixture, which would be lost due to volatilization of the phosphoric acid component in the test equipment and, accordingly, did not tell if phosphoric acid component losses would occur in the commercial operation. In addition detrimental melting would sometimes occur even though the laboratory test indicated that the reaction feed mixture would not produce melting.

This prior simulation procedure for determining the defluorination characteristics of a Pollyphos feed to a fluid bed calcinator follows:

The equipment required included a Lindberg Hevi-Duty combustion tube furnace, 115–230 V, 50/60-cycle A.C., type 54032-A Hevi-Duty Heating (from Equip. Co., Watertown, Wis.) which has a maximum temperature of about 2200° F., combustion tubes (Zircon 24 in.×1 in.), a water bath* (Fisher Scientific, Cat. No. 6643-120 A.C., 520 watts, 4.3 amps, Rheostat control, dimension 12¼ in.×10½ in.), Tygon tubing (5/16-in. I.D.), a 50-ml vacuum flask, a 0–10 SCFH air rotameter (Dwyer Mfg. Co.), a heavy duty powerstat variable transformer (Type F136B, 22 amps, Merquip Electronics, 4939 North Elston, Chicago, Ill.), a 0°–120° C. thermometer, an air supply, platinum combustion boats** (3⅛ in. L×¾ in. W×½ in. H), glass beads (¼ in.), a trip balance, a boat puller and tongs, and a portable pyrometer (Type 1200 (VP to 2400° F., Alnor Inst. Co., Division of Ill. Testing Laboratories, Inc., 420 North La-Salle St., Chicago, Ill. 60610).

*A heating mantle and 5000-ml flask could also be used.
**Alundum combustion boat (Wells 9421, 4½ in. L×⅝ in. W×7/16 in. H) could also be used, when fusion is not a problem.

The Procedure used follows:

1. Preheat tube furnace, water bath and vacuum flask containing $H_2O$.

2. Make all proper connections as illustrated in diagram.

3. Maintain following temperatures and rates:
   a. Water Bath: Set dial to give 85° C. water temperature inside vacuum flask.
   b. Tube Furnace: 2200° F.+10° F. (check with optical pyrometer if available).
   c. Air Rotameter: 7 SCFH or equivalent to 3-ft./sec. velocity.

4. Once equilibrium is established throughout the system, testing is begun.

5. Taking platinum boat and add three grams of test material. Spread one layer deep in bottom of boat.

6. Insert in combustion tube to the center of the hot zone.

7. Hold for 15 minutes.

8. Remove, cool and analyze for desired constituents.

One embodiment of the invention involves a process for producing a defluorinated product containing calcium, sodium and phosphorus, by calcination of a reaction mixture comprising phosphate rock, caustic soda, phosphoric acid and water, said process comprising:

(a) with a representative sample of the phosphate rock, making an experimental determination of the amount of material in the phosphate rock which will not be evolved as a vapor when the phosphate rock is heated to a predetermined temperature at least as high as 1900° F., said determination being made by using calculations and methods to make a sample reaction feed mixture comprising said representative sample of phosphate rock, a representative sample of phosphoric acid and caustic soda, said sample mixture being suitable for making a calcined product of a predetermined content of calcium, fluorine, phosphorus, and sodium. Drying said sample mixture at about 105° C., determining the amount of a non-volatile component in said dried sample mixture, by heating the dried sample mixture to said predetermined temperature at least as high as 1900° F. to produce a defluorinated calcined product sample wherein the content of fluorine in said dried sample mixture has been lowered to at least a predetermined amount in said calcinated product sample, determining the amount of said non-volatile component in said defluorinated calcinated product sample;

(b) determining by analysis the content of phosphorus in said representative sample of phosphoric acid and the content of phosphorus and calcium in said representative sample of phosphate rock; and (c) making a reaction mixture from components comprising said phosphate rock, said phosphoric acid, caustic and water, wherein the amount of phosphoric acid in the mixture is such that the ratio of phosphorus in percentage by weight on a dry basis in said mixture-to-the phosphorus desired in percentage by weight in the calcinated product is substantially equivalent to the ratio of the non-volatile component in percentage by weight on a dry basis in the mixture-to-the non-volatile component in percentage by weight in the calcined product.

Thereafter, the reaction feed mixture is dried and calcined to produce, without detrimental melting, a defluorinated calcined product from the reaction feed mixture. Surprisingly, the phosphate rock used in said reaction fed mixture can have a bone phosphate of lime value less than about 73%.

The process is especially useful where the reaction feed mixture is formed in a reaction pug mill configured such that there are inlets for separate serial feeding to said reaction pug mill in a continuous manner, by first introducing phosphate rock, then phosphoric acid, then caustic, and then water as feeds to said reaction pug mill, and wherein said reaction mixture is formed in said pug mill by feeding said components to said pug mill by said separate serial feeding.

The following is a procedure to determine total P or $P_2O_5$ in phosphate rock, Pollyphos or phosphoric acid:

1. Weigh approximately 1 g. of sample into a 250 ml. volumetric flask (for 54% $P_2O_5$ acid use about 0.5 g.)
2. Digest with 20 ml. $HNO_3$ and 5 ml. HCl to absence of brown fumes.
3. Remove and cool, fill to mark and mix thoroughly 3 times.
4. Pipette 25 ml. into a 400 ml. beaker. Add 50 ml. of heated (56° C.) 10% solution of Ammonium Nitrate, precipitate with 50 ml. of Molybdic acid solution and stir for 15 min.
5. Filter through funnel with asbestos pad using vacuum.
6. Wash beaker thoroughly with distilled water, removing all yellow precipitate. Allow all the solution to filter through before washing pad.
7. Wash funnel and pad 5 times (allowing water to filter each time) to remove all the acid.
8. Transfer yellow precipitate back into the 400 ml. beaker, washing funnel well using policeman.
9. Titrate with 0.3240 N Sodium Hydroxide solution adding about 1 ml. excess.
10. Add 10 drops of 1% solution of Phenolphthalein indicator.
11. Titrate with 0.3240 N Nitric Acid solution to colorless or a pH of 7.8–8.0 endpoint using a standard sample to make necessary correction.

CALCULATION:

$$\frac{\text{Net titration}}{\text{Sample wt.}} = P_2O_5 \quad \begin{array}{l} P_2O_5 \times 2.185 = BPL \\ P_2O_5 \times 0.437 = P \end{array}$$

In calculating the maximum amount of P which can be added as phosphoric acid without causing substantial fusion, the following equation can be used:

$$\frac{\text{Max added } P_2O_5}{P_2O_5 \text{ in Rock}} = \frac{0.181 \times \frac{142}{62} - 71 \times \frac{142}{310}}{71 \times \frac{142}{310}}$$

Where "max added $P_2O_5$" is the maximum amount of $P_2O_5$ which can be added as phosphoric acid without incurring substantial fusion, for a final calcined product containing about 18.1% P.

ILLUSTRATIVE EXAMPLE

Referring to FIG. 1, 13.55 tons per hour of 72% BPL ground phosphate rock are fed from a rock surge bin 70 through line 1 to a reactor pug mill 72, through a feed inlet furthest from the discharge end of the pug mill. About 3.30 tons per hour of 54% $P_2O_5$ content phosphoric acid are fed through pipe 2 to the adjacent feed inlet of the pug mill, the amount of phosphoric acid being maintained such that the ratio of phosphorus in percentage by weight on a dry basis in said mixture-to-the phosphorus desired in percentage by weight in the calcined product is substantially equivalent to the ratio of the calcium in percentage by weight on a dry basis in the mixture-to-the calcium in percentage by weight in the calcined product. The phosphorus and calcium in the rock are determined by analysis from time to time, and the rate of phosphoric acid addition is adjusted to maintain the ratio.

2.52 tons per hour of a 50% aqueous solution of sodium hydroxide are fed through pipe 3 to the next adjacent feed inlet of the pug mill and, at the feed inlet next closest to the discharge end of the pug mill, scrubber water (containing about 5% solids) is fed through pipe 4a to the pug mill. The rate of scrubber water addition is controlled such that the reaction mixture exiting the reactor pug mill has sufficient fluidity for transport through line 73 to a second pug mill 74, the granulation pug mill, and for the granulation process therein (generally, the mixture leaving the reactor pug mill should have a "soupy" consistency).

The total scrubber water used (about 19 g/m. or 9,400 lb./hr.) is divided between scrubber water fed to the reactor pug mill and scrubber water fed through pipe 4b to the granulator pug mill 74, the relative proportions being determined during the operation in order to obtain the desired fluidity and granulation.

Although any convenient source of water, such as a settled pond water or fresh water, can be used, it is preferred to use water from the vapor scrubbers (scrubber water) because such wash water contains fine solids which aid in the granulation and which otherwise would be wasted. When the water used contains $P_2O_5$ values, such as pond water, or scrubber water obtained from pond water, the amount of P therein is considered to be part of the added phosphoric acid feed to the pug mill.

In the present process, the two major gaseous or vapor streams which are scrubbed, and which contribute solids to the scrubber water, are the gases evolved from the reactor pug mill 72 and the gases evolved from the dryer cyclone 82 (described below).

A fifth material (comprising fines from screened, dried reaction mixture) is fed from hopper 78 to the reactor pug mill 72, through lines 5 and 5a. The fifth material is introduced to granulator pub mill 74 through line 5b. Gases (about 101,129 pound per hour) produced in pug mill 72 are exited from the pug mill through pipe 17.

The fifth material or "fines" added to the reactor pug mill and to the granulator pug mill consists of granules or smaller particles from a dryer 76 which passed through a feed preparation screen 90 (described below). The total "fines" supplied to the two pug mills are about 15 tons per hour.

The product or wet granulated reaction feed mixture is discharged from the granulator pug mill 74 and transported through line 6 to the dryer 76 to produce a dry granulated reaction mixture. About 38.1 tons per hour of the wet mixture is produced in pug mill 74. The mixture is discharged from the dryer 76 and transported through lines 7a and 7b and elevator 88 to the feed preparation screen 90. About 30 tons per hour of the dried mixture is produced in the dryer. Dust and gases (collectively about 81,934 pounds per hour) are discharged from the dryer 76 and transported to cyclone 82 via line 8 wherein the gases and dust are separated. The gases (about 78,414 pounds per hour) are conveyed from cyclone 82 via pipe 9 and combined with the gases in discharge pipe 17 and transported to a scrubber (not shown). The dust (about 1.76 tons per hour) is transported to a recycle screw conveyor 86 (described below) via conduit 10. Natural air and gas for combustion are supplied to the dryer burner 21 through pipes 19 and 20, respectively.

In the screening operation at screen 90, about 7.45 tons per hour of oversized material passes to a cage mill 94 via line 11 where it is broken down and passed to the recycle screw conveyor 86 which also conveys the fines, or undersized material, (about 4.47 tons per hour) from screen 90 via line 12. Alternatively, oversized material from cage mill 94 can be transported via line 11a to elevator 88 for recycle through screen 90. The desired sized granules from the screen 90 pass to feed preparation surge bin 92 via line 13 where the overflow of about 1.1 tons per hour goes to the recycle screw conveyor 86 via line 13a while the bulk of the desired sized granules (about 16.8 tons per hour) are conveyed by conveyors 96 and 98, and lines 15a and 15b to the reactor feed bin 100, which feeds the desired sized granules (about 8.48 tons per hour) to two fluidized bed reactors (only one of which is shown in FIG. 104) via conveyor 101, elevator 102, and line 103. The calcined product from the fluid bed reactors 104 contains less than one part of fluorine per 50 parts of $P_2O_5$. The calcined product (about 15 tons per hour) is discharged from the reactors 104 and transported to the fluid bed reactor cooler 108 via line 24b. Cooling air is supplied to cooler 108 through conduit 27. The cooler calcined product is passed to conveyor 110 via line 25b for transportation to a storage and packaging area (not shown). Gases and dust from reactors 104 are moved to cyclone 105 via line 24a for separation. The separated dust is moved to a storage area (not shown) via line 35a and the gases are discharged through line 36b.

The rejected, broken, oversized and fine material from the screen 90, bin 92, mill 94 and cyclone 82 are recycled to the pug mills 72 and 74 via screw conveyor 86, line 85, elevator 84, hopper 78 and lines 5, 5a and 5b. Dust from the pug mills 72 and 74 is transported via a line (not shown) to a feed preparation dust collector 80. The collected dust (about 0.23 ton per hour) is transported to the screw conveyor 86 via line 14. About 43,217 pounds per hour of air is supplied to collector 80 through pipe 16.

Table 1 herein reports a typical analysis of the phosphate rock, the phosphoric acid, fthe calcined product, the typical ratio of the weight % of calcium in the dried reaction mixture to the weight % of calcium in the calcined product, and the corresponding ratio of the weight % of P in the reaction mixture-to-the weight percentage of P in the calcined product.

TABLE I

| ANALYSIS OF PHOSPHATE ROCK (IN WEIGHT %) | | | | | | | | |
|---|---|---|---|---|---|---|---|---|
| −200 TYLER MESH | BPL | $P_2O_5$ | INSOL | $Fe_2O_3$ | $Al_2O_3$ | CaO | MgO | $H_2O$ |
| 75 | 72.7 | | 4.6 | 0.84 | 1.06 | 47.29 | 0.37 | 1.24 |

| ANALYSIS OF PHOSPHORIC ACID (IN WEIGHT %) | | | | | | | | | |
|---|---|---|---|---|---|---|---|---|---|
| DENSITY | $P_2O_5$ | SUSP. SOLIDS | $Fe_2O_3$ | $Al_2O_3$ | CaO | MgO | $SO_4$ | $Na_2O$ | F |
| 1.697 | 54.55 | (0.5) | 1.33 | 1.63 | 0.16 | 0.40 | 2.87 | 0.05 | 0.715 |

| ANALYSIS OF REACTION MIXTURE ROCK AND ACID | | | | | | | |
|---|---|---|---|---|---|---|---|
| | | P | F | $Na_2O$ | $H_2O$ | INSOLUBLES | BPL |
| Before Calcining | A | 16.45* | 3.0 | 5.53* | 2.72 | | |
| After Calcining (Product) | A | 18.05 | 0.10 | 5.91 | | | |
| Phosphate Rock | A | | | | | 4.5 | 72.4 |
| Phosphoric Acid | A | 54.54 | 0.11 | | | | |

TABLE I-continued $$\frac{\text{Dried Mix Ca}}{\text{Calcined Ca}} = 0.91 = \frac{\text{Dried Mix \% P}}{\text{Calcined \% P}} = \frac{16.45}{18.05}$$

A = Run Average
*Dry Basis

What is claimed is:

1. In a process for producing a defluorinated, calcined product having a weight ratio P to F greater than 50 to 1 and containing calcium, sodium and phosphorus, by calcination of a mixture comprising phosphate rock, containing phosphorus, calcium and fluorine and having a bone phosphate of lime analysis of from about 71 to about 77, with caustic soda, phosphoric acid and water, said mixture having a weight ratio P to F less than 50 to 1 wherein said mixture is mixed in a first stage then granulated in a second step, to produce a granulated mixture, and said granulated mixture is calcined and said calcination being conducted at a temperature of at least about 1900° F. and at conditions which produce said defluorinated, calcined product, the improvement wherein the amount of phosphoric acid in the mixture is such that the ratio of phosphorus in percentage by weight on a dry basis in said mixture-to-the phosphorus desired in percentage by weight in the defluorinated, calcined product is substantially equivalent to the ratio of the calcium in percentage by weight on a dry basis in the mixture-to-the calcium in percentage by weight in the defluorinated, calcined product, and wherein the desired percent by weight of phosphorus in the defluorinated, calcined product is from about 17% to about 18.9%.

2. The process of claim 1 wherein the phosphate rock has a bone phosphate of lime analysis of no greater than about 73.

3. The process of claim 1 wherein the phosphate rock has a bone phosphate of lime analysis of about 71.5.

4. The process of claim 1 wherein the proportion of phosphorus in the form of phosphoric acid in the mixture is such that there is no substantial fusion upon calcination.

5. The process of claim 1, calcined wherein said mixture is made by adding, during mixing, phosphoric acid to the phosphate rock followed by the addition of caustic soda and then the addition of water.

6. In a process for producing a defluorinated, calcined product containing calcium, sodium and phosphorus, by calcination of a mixture comprising phosphate rock, having a weight ratio P to F greater than 100 to 1 and containing phosphorus, calcium and fluorine and having a bone phosphate of lime analysis no greater than about 73, with caustic soda, phosphoric acid and water, and wherein said mixture is mixed in a first step, then granulated in a second step, to produce a granulated mixture, and said granulated mixture is calcined to produce said defluorinated, calcined product, the improvement wherein the amount of phosphoric acid in the mixture is such that the ratio of phosphorus in percentage by weight on a dry basis in said mixture-to-the phosphorus desired in percentage by weight in the calcined, defluorinated product is substantially equivalent to the ratio of the calcium in percentage by weight on a dry basis in the mixture-to-the calcium in percentage by weight in the defluorinated calcined product, and wherein during mixing in said first step phosphoric acid is added to the phosphate rock, followed by the addition of caustic soda and then the addition of water and wherein the proportion of phosphorus in the form of phosphoric acid in the mixture is such that there is no substantial fusion upon calcination and wherein the desired percent by weight of phosphorus in the defluorinated, calcined product is from about 17% to about 18.9%.

* * * * *